United States Patent

[11] 3,626,067

[72] Inventor John Harvey, Jr.
Wilmington, Del.
[21] Appl. No. 468,999
[22] Filed July 1, 1965
[45] Patented Dec. 7, 1971
[73] Assignee E. I. du Pont de Nemours and Company
Wilmington, Del.

[54] SUBSTITUTED OXAZOLINES, USEFUL AS PHARMACEUTICALS
15 Claims, No Drawings
[52] U.S. Cl.................................................. 424/272,
260/307 R
[51] Int. Cl.......................................................A61k 27/00,
C07d 85/00
[50] Field of Search............................................ 260/329,
346.1, 307; 167/65; 424/272

[56] References Cited
UNITED STATES PATENTS
2,027,031  1/1936  Engelmann................... 260/44
2,870,160  1/1959  Bloom........................... 260/307
OTHER REFERENCES
Bloom et al. J. Am. Chem. Soc. vol. 79 pg. 5072 (1957) QD1A5.

*Primary Examiner*—Leland A. Sebastian
*Attorney*—Herbert W. Larson

CLAIM: 1. A compound of the formula

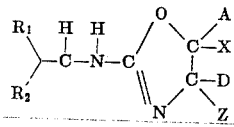

$R_1$ is phenyl, 2-thienyl, 3-thienyl, 2-furanyl or 3-furanyl; $R_2$ is methyl, ethyl, or cyclopropyl; A, X, D and Z are each separately hydrogen or alkyl of one through four carbon atoms with the limitation that the total number of carbon atoms added together in A, X, D and Z is less than nine.

14. A pharmaceutical composition containing an inert pharmacological diluent and a pharmacologically active amount of a compound of the formula

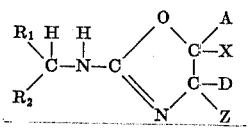

$R_1$ is phenyl, 2-thienyl, 3-thienyl, 2-furanyl or 3-furanyl; $R_2$ is methyl, ethyl, or cyclopropyl; A, X, D and Z are each separately hydrogen or alkyl of one through four carbon atoms with the limitation that the total number of carbon atoms added together in A, X, D and Z is less than nine.

SUBSTITUTED OXAZOLINES, USEFUL AS PHARMACEUTICALS

This invention relates to substituted amino-oxazolines.

More specifically, this invention refers to compounds of the formula (1) 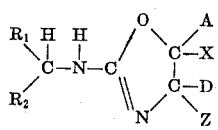

wherein $R_1$ is phenyl, 2-thienyl, 3-thienyl, 2-furanyl or 3-furanyl; $R_2$ stereoisomers methyl, ethyl, or cyclopropyl; A, X, D and Z are each separately hydrogen or alkyl of one through four carbon atoms with the total carbon atoms added together in A, X, D and Z being less than nine.

Accordingly, compounds of the following structure are contemplated by may invention.

(2) 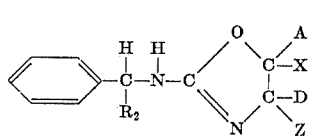

(3) 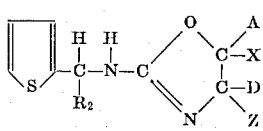

(4) 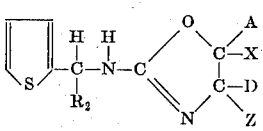

(5) 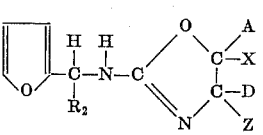

(6) 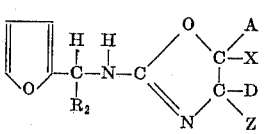

In structural formulas 2–6 $R_2$, A, X, D and Z have the meaning as in formula 1.

The carbon atom to which $R_1$ and $R_2$ are attached is asymmetric and therefore my invention includes racemic mixtures and the stereoisomers of the compounds found in formula 1.

UTILITY

The compounds of my invention exhibit valuable pharmacological properties including antihypertensive, and central nervous depressant activity coupled with unexpectedly low toxicity and outstanding high therapeutic ratios at low rates of use.

PREPARATION

The compounds of formula 2 are made by dissolving α-methylbenzylamine, α-ethylbenzylamine or α-cyclopropylbenzylamine respectively in hexane. Thereafter benzene solution containing an equivalent amount of 2-chloroethylisocyanate is added dropwise. After 1 hour a product is collected as 1-(2-chloroethyl)-3(α-methyl-, α-ethyl- or α-cyclopropylbenzyl)urea. This material is added to water after the water is boiling and the mixture is boiled under reflux for about 30 minutes and then cooled to 25° C. The resulting solution is made strongly alkaline with ammonium hydroxide and extracted three times with chloroform. The combined chloroform extracts are washed with water and dried over anhydrous sodium sulfate. Thereafter it is concentrated in vacuo. The residue is triturated with cold ether and the crystalline product is collected on a filter. The product is either 2-(α-methyl, α-ethyl or α-cyclopropylbenzylamino)-2-oxazoline. In circumstances where a substituted oxazoline is needed the urea starting material will be a 1-(alkyl-2-chloroethyl)-3-(α-alkylbenzyl)-urea. The first alkyl can be mono-, di-, tri- or tetra- depending upon the meaning of A, X, D and Z.

The compounds of formulas 3 and 4 above are made in a manner similar to the synthesis steps for the compounds of formula 2 except that the starting urea is 1-(2-chloroethyl)-3-(α-alkyl-2 or 3-thienyl)urea. The compounds of formulas 5 and 6 are also made in the same manner except that the starting urea is 1-(2-chloroethyl)-3-(α-alkyl-2- or 3-furfuryl)urea.

With reference to the oxazolines of this invention it is specifically intended to include within the purview of the invention, the acid addition salts which these compounds form with acids having pharmaceutically acceptable anions. The term "pharmaceutically acceptable anion" has a definite meaning to one skilled in the art. It is defined as a nontoxic anion of any of the simple acids commercially used to neutralize basic medicinal agents. These acids include, for example, hydrochloric, hydrobromic, hydroiodic, sulfuric, succinic, maleic, tartaric, citric, gylcolic and others. The pharmaceutical activity of the molecule is primarily a function of the cation, the anion serving chiefly to supply electric neutrality.

By reference to the reaction described above, it can be seen that in the ordinary practice of the process of the invention, the oxazolines produced will be hydrobromides, hydrochlorides, hydroiodides, methanesulfonic acids or p-toluenesulfonic acids. These acids can be converted to other pharmaceutically acceptable acids by procedures well known to those skilled in the art. One highly useful method comprises contacting the acid addition salt with a basic anion exchange resin, for example, a highly basic compound such as the one available from Rohm & Haas Company under the name Amberlite IRA-400. This resin is a polyquaternary ammonium compound which is prepared by chloromethylating a highly cross-linked copolymer of styrene and divinylbenzene followed by treatment of the chloromethylated material with a tertiary amine such as trimethylamine. To prepare an acid addition salt of this invention, for example, the citrate, the resin is first contacted with an aqueous solution of citric acid whereupon an anion exchange takes place converting the quaternary halide to the citrate. The citrate resin is then contacted with an acid addition salt prepared as described above and a further anion exchange takes place converting the acid addition salt to the citrate and leaving the anion of the original slat on the resin. The citrate salt can be recovered from the eluate by a number of methods such as evaporation or solvent precipitation. This same procedure can be used to prepare nitrates, sulfates, acetates and other acid addition salts.

PHARMACEUTICAL COMPOSITIONS

The compounds of my invention can be administered alone but are generally administered with a pharmaceutical carrier selected on the basis of the chosen route of administration and standard pharmaceutical practice. For example, a compound can be administered orally in the form of tablets or capsules containing such excipients as starch, milk sugar, certain types of clay, etc. The compound can be administered orally in the form of an elixir or oral suspension which can contain coloring and flavoring agents. The compound can be injected parenterally and for this use can be prepared in the form of sterile aqueous solutions containing other solutes such as saline or glucose in sufficient quantity to make the solution isotonic. For intramuscular administration compositions of the compounds of my invention can be prepared in an oil base such as peanut or sesame oil.

DOSAGE

The compounds of my invention will be administered in a dosage generally of the same or lower order of magnitude as with other pharmaceutical agents having the same type of desired activity. In certain instances it can be found that because of their high order of activity the optimum dosage of the compounds of my invention will be lower than the optimum dosage of other compounds generally recommended for the same use. In general, the physician or veterinarian will determine the dosage which will be most suitable for a particular application, and as might be expected, it will vary with the age, weight and general health of the patient under treatment and with various other factors which will be determined by the physician or veterinarian in attendance. When a compound is administered orally a larger quantity will be required to produce the same effect as a smaller quantity given parenterally. Parenteral administration of from 0.1 mg. to 250 mg. of active agent is suitable for the desired effect.

The compositions of my invention can take a variety of forms. Various diluents can be employed and the percentage of active ingredients can be varied. It is necessary that an active ingredient form a proportion of the composition such that a suitable dosage form will be obtained. Obviously several dosage unit forms can be administered at about the same time. Although compositions with less than 0.005 percent by weight of active ingredient are suitable, it is preferred to use compositions containing not less than 0.005 percent of the active agent because otherwise the amount of carrier becomes excessively large. Activity increases with the concentration of the active agent. The percentage by weight of active agent can be 10, 50, 75, 95 percent or even higher. Dosage unit forms can be prepared with a minor proportion of a carrier and a major proportion of active materials and vice versa.

Administration can be vapor or spray applications through the mouth and nasal passages.

The following examples are given solely for the purpose of illustration and are not to be construed as limitations of this invention, many variations of which are possible without departing from the spirit or scope thereof.

EXAMPLE 1

1-(2-chloroethyl)-3-( -methylbenzyl)urea

To 0.3 mole α-methylbenzylamine dissolved in 150 ml. hexane is added dropwise a benzene solution of 0.3 mole 2-chloroethyl isocyanate. The mixture is allowed to stand for 1 hour, and after chilling the product is collected on a filter.

2-(α-methylbenzylamino-2-oxazoline

One liter of water is brought to boiling and 15 grams of 1-(2-chloroethyl)-3-(α-methylbenzyl)urea is added. The mixture is boiled under reflux for 30 minutes, and cooled to 25° C. The resulting solution is made strongly alkaline with ammonium hydroxide and extracted three times with 300 ml. portions of chloroform. The combined chloroform extracts are washed once with 300 ml. water, dried over anhydrous sodium sulfate, and concentrated in vacuo. The residue is triturated with cold ether, and the crystalline product is collected on a filter. After recrystallization from chlorothene it melts at 111°–115° C.

Calc'd. for $C_{11}H_{14}N_2O$: C, 69.4; H, 7.4; N 14.7

Found: C, 69.7; H, 7.7; N, 14.4

Using the 2-(α-methylbenzylamino)-2-oxazoline, the following pharmaceutical compositions are prepared.

A. A large number of unit capsules are prepared for oral administration by mixing the following ingredients:

| | Parts by Weight |
|---|---|
| 2-(α-methylbenzylamino)-2-oxazoline | 2,000 |
| lactose U.S.P. | 7,950 |
| dry pyrogenic silica $SiO_2$ with particle size of 0.015 microns, surface area of 200 m.²/g. and bulk density of 2.2 lbs./cu. ft. ("Cabosil," Cabot Corp.) | 50 |

After mixing, the mixture is screened through a 40-mesh screen and encapsulated in No. 3 two-piece hard gelatin capsules.

B. The 2-(α-methylbenzylamino)- 2-oxazoline, 20 parts by weight, is dispersed in 100 parts by volume of corn oil and encapsulated in standard soft gelatin capsules.

C. Tablets for oral administration are prepared by mixing 50 milligrams of 2-(α-methylbenzylamino)-2-oxazoline, 2.5 milligrams of gelatin, 2.5 milligrams of magnesium stearate and 100 milligrams of starch, and forming the mixture into tablets by a conventional tableting machine. Slow release pills and tablets can also be used.

D. A parenteral composition suitable for administration by injection is prepared by dissolving 5 percent by weight of 2-(α-methylbenzylamino)-2-oxazoline in 95 percent by volume of physiological saline and sterilizing the resultant solution by filtration. A buffer can be used if desired.

Mice are injected via the tail vein at a dosage of 0.03 mg./kg. of 2-(α-methylbenzylamino)-2-oxazoline, formulated as in D above. Marked central nervous system depression results as exemplified by depression of spontaneous motor activity for more than an hour. Toxicity occurs at such dosages that a therapeutic ratio of 300 or more is obtained.

E. A composition suitable for aerosolization is prepared by dissolving 5 percent by weight of 2-(α-methylbenzylamino)-2-oxazoline in 95 percent by volume of methylene dichloride.

Mice are placed in a 2.85 liter bell-jar chamber into which 2-(α-methylbenzylamino)-2-oxazoline, formulated as in E above, is so that the animals are exposed to a nominal concentration in the vapor phase of 14 mg./l. of the active ingredient for 5 min. Pronounced central nervous system depression occurs as shown by absence of locomotor activity by the mice as measured in a Woodard Activity Case Counter 30 minutes after exposure. Recovery is normal.

EXAMPLES 2–6

The following compounds are synthesized in the manner of the 2-(α-methylbenzylamino)-2-oxazoline of example 1 by substituting a like amount by weight of the appropriate starting materials for the starting materials of example 1. They are formulated and applied in like manner to provide like results.

2. 2-(α-ethylbenzylamino)-2-oxazoline.
3. 2-(α-cyclopropylbenzylamino)-2-oxazoline.
4. 5-methyl-2-α-methylbenzylamino)-2-oxazoline.
5. 5-n-butyl-2-(α-ethylbenzylamino)-2-oxazoline.
6. 4,5-dimethyl-2-(α-methylbenzylamino)-2-oxazoline.

EXAMPLE 7

1-(2-chloroethyl)-3-(α-methyl-2-thenyl)urea

To 0.3 mole α-methyl-2-thenylamine dissolved in 100 ml. hexane is added dropwise a benzene solution of 0.3 mole 2-chloroethyl isocyanate. The mixture is allowed to stand for 30 minutes and after chilling the product is collected on a filter. It melts at 90 –92 C.

Calc'd. for $C_9H_{13}ClN_2OS$: C,46.4; H,5.6; Cl,15.2; N,12.0
Found: C,46.7; H,5.5; Cl,15.2; N,12.3

2-(α-methyl-2-thenylamino)-2-oxazoline

One liter of water is brought to boiling and 15 g. of 1-(2-chloroethyl)-3-(α-methyl-2-thenyl)urea is added. The mixture is boiled for 1 hour under reflux, and cooled to 25° C. The resulting solution is made strongly alkaline with ammonium hydroxide, and extracted three times with 300 ml. portions of chloroform. The combined chloroform extracts are washed once with 300 ml. water, dried over anhydrous sodium sulfate, and concentrated in vacuo. The residue is crystallized from cold pentane and collected on a filter. After recrystallization from acetonitrile it melts at 96°–97° C.

Calc'd. for $C_9H_{12}N_2OS$: C,55.0; H,6.2; N,14.3; S,16.4
Found: C,54.6; H,6.2; N,14.2; S,16.2

EXAMPLES 8–14

The following compounds are synthesized in the manner of the 2-(α-methyl-2-thenylamino)-2-oxazoline of example 7 by substituting a like amount by weight of the appropriate starting materials for the starting materials of example 7.

8. 2-(α-ethyl-2-thenylamino)-2-oxazoline.
9. 2-(α-cyclopropyl-2-thenylamino)-2-oxazoline.
10. 4-ethyl-2-(α-ethyl-2-thenylamino)-2-oxazoline.
11. 4,4,5,5-tetramethyl-2-(α-methyl-2-thenylamino)-2-oxazoline.
12. 4-ethyl-5-methyl-2-(α-methyl-3-thenylamino2-oxazoline.
13. 2-(α-methyl-3-thenylamino)-2-oxazoline.
14. 4-ethyl--(α-methyl-2-thenylamino)-2-oxazoline.

EXAMPLE 15

1-(2-chloroethyl)-3-(α-methyl-2-furfuryl)urea

To 0.3 mole of α-methylfurfurylamine dissolved in 100 ml. hexane is added dropwise a benzene solution of 0.3 mole 2-chloroethyl isocyanate. The mixture is allowed to stand for 1 hour and after chilling the product is collected on a filter. It melts at 108°–108.5° C.

Calc'd. for $C_9H_{13}ClN_2O_2$: C,49.9; H,6.1; Cl,16.4; N,12.9
Found: C,50.1; H,6.3; Cl,16,2; N,12.9

2-(α-methyl-2-furfurylamino)-2-oxazoline

Two liters of water are brought to boiling and 40 g. of 1-(2-chloroethyl-3-(α-methyl-2-furfuryl)urea is added. The mixture is boiled under reflux for 30 minutes, and cooled to 25° C. The resulting solution is made strongly alkaline with ammonium hydroxide and extracted three times with 600 ml. portions of chloroform. The combined chloroform extracts are washed once with 600 ml. water, dried over anhydrous sodium sulfate and concentrated in vacuo. The residue is crystallized in cold ether, and collected on a filter. After recrystallization from acetonitrile it melts at 88°–89° C.

Calc'd. for $C_9H_{12}N_2O_2$: C60.0; H,6.7; N,15.5
Found: C,59.9; H,6.6; N,15.6

EXAMPLES 16–20

The following compounds are synthesized in the manner of the 2-(α-methyl-2-furfurylamino)-2-oxazoline of example 15 by substituting a like amount by weight of the appropriate starting materials for the starting materials of example 15.

16. 2-(α-methyl-3-furfurylamino)-2-oxazoline.
17. 2-(α-ethyl-2-furfurylamino)-2-oxazoline.
18. 2-(α-cyclopropyl-2-furfurylamino)-2-oxazoline.
19. 4,5-diethyl-2-(α-methyl-2-furfurylamino)-2-oxazoline.
20. 4,4-dimethyl-5-t-butyl-2-(α-ethyl-2-furfurylamino)-2-oxazoline

EXAMPLES 21–26

In the same manner as in example 1D, mice are injected with indicated amounts of the following compounds. Marked central nervous system depression results are exemplified by depression of spontaneous motor activity.

| Ex. No. | Compound | Dosage, mg./kg. | Therapeutic ratio |
| --- | --- | --- | --- |
| 21 | 2-(α-ethylbenzylamino)-2-oxazoline | 1.0 | 18 |
| 22 | 2-(α-cyclopropylbenzylamino)-2-oxazoline | 0.2 | 250 |
| 23 | 2-(α-methyl-2-furfurylamino)-2-oxazoline | 0.03 | 750 |
| 24 | 2-(α-ethyl-2-thenylamino)-2-oxazoline | 0.01 | 1300 |
| 25 | 2-(α-ethyl-2-thenylamino)-2-oxazoline | 0.02 | 250 |
| 26 | 2-(α-cyclopropyl-2-thenylamino)-2-oxazoline | 0.06 | 333 |

EXAMPLES 27–30

In the same manner as in example 1E, mice are exposed to the indicated amounts of the following compounds. Marked central nervous system depression results as exemplified by decreased locomotor activity. Recovery is normal.

| Ex. No. | Compound | Conc. of act. ing. in vapor phase, mg./l. | Mins. of exposure |
| --- | --- | --- | --- |
| 27 | 2-(α-ethylbenzylamino)-2-oxazoline | 13 | 5 |
| 28 | 2-(α-cyclopropylbenzylamino)-2-oxazoline | 4 | 5 |
| 29 | 2-(α-methyl-2-thenylamino)-2-oxazoline | 2 | 1 |
| 30 | 2-(α-ethyl-2-thenylamino)-2-oxazoline | 1 | 5 |

Compounds of my invention can be combined with those anticholinergics set forth in an application assigned to my assignee, Ser. No. 348,291 filed Feb. 28, 1964. The mixtures obtained also exhibit central nervous system depressant activity. The oxazolines of my invention can be combined with the anticholinergics of the aforementioned application at the same rates and can be applied to animals in the same manner.

I claim:
1. A compound of the formula.

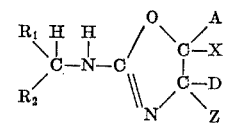

wherein $R_1$ is phenyl, 2-thienyl, 3-thienyl, 2-furanyl or 3-furanyl; $R_2$ is methyl, ethyl, or cyclopropyl; A, X, D and Z are each separately hydrogen or alkyl of one through four carbon atoms with the limitation that the total number of carbon atoms added together in A, X, D and Z is less than nine.

2. A compound of the formula

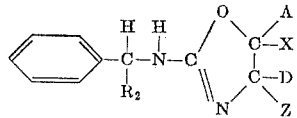

wherein $R_2$ is methyl, ethyl or cyclopropyl; and A, X, D and Z are each separately hydrogen or alkyl of one through four carbon atoms with the limitation that the total number of carbon atoms in A, X, D and Z is less then nine.

3. A compound of the formula

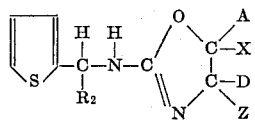

wherein $R_2$ is methyl, ethyl or cyclopropyl; and A, X, D and Z are each separately hydrogen or alkyl of one through four carbon atoms with the limitation that the total number of carbon atoms in A, X, D and Z is less than nine.

4. A compound of the formula

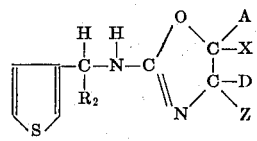

wherein $R_2$ is methyl, ethyl or cyclopropyl; and A, X, D and Z are each separately selected from the group consisting of hydrogen or alkyl of one through four carbon atoms with the limitation that the total number of carbon atoms in A, X, D and Z is less than nine.

5. A compound of the formula

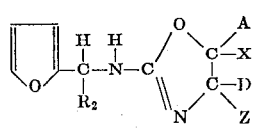

wherein $R_2$ is methyl, ethyl or cyclopropyl; and A, X, D and Z are each separately selected from the group consisting of hydrogen or alkyl of one through four carbon atoms with the limitation that the total number of carbon atoms in A. X, D and Z is less than nine.

6. A compound of the formula

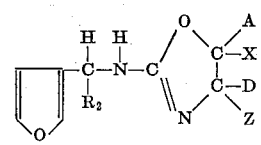

wherein $R_2$ is methyl, ethyl or cyclopropyl; and A, X, D and Z are each separately selected from the group consisting of hydrogen or alkyl of one through four carbon atoms with the limitation that the total number of carbon atoms in A, X, D and Z is less then nine.

7. 2-($\alpha$-methylbenzylamino)-2-oxazoline.
8. 2-($\alpha$-ethylbenzylamino)-2-oxazoline.
9. 2-($\alpha$-cyclopropylamino)-2-oxazoline.
10. 2-($\alpha$-methyl-2-furfurylamino)-2-oxazoline.
11. 2-($\alpha$-ethyl-2-thenylamino)-2-oxazoline.
12. 2-($\alpha$-ethyl-3-thenylamino)-2-oxazoline.
13. 2-($\alpha$-cyclopropyl)-2-thenylamino)-2-oxazoline.
14. A pharmaceutical composition containing an inert pharmacological diluent and a pharmacologically active amount of a compound of the formula

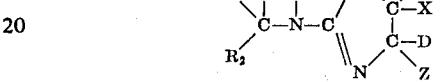

wherein $R_1$ is phenyl, 2-thienyl, 3-thienyl, 2-furanyl or 3-furanyl; $R_2$ is methyl, ethyl, or cyclopropyl; A, X D and Z are each separately hydrogen or alkyl of one through four carbon atoms with the limitation that the total number of carbon atoms added together in A, X, D and Z is less than nine.

15. Method of effecting central nervous system depression comprising administering to a warm-blooded animal a pharmacologically active amount of a compound of the formula

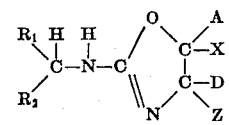

wherein $R_1$ is phenyl, 2-thienyl, 3-thienyl, 2-furanyl or 3-furanyl; $R_2$ is methyl, ethyl, or cyclopropyl; A, X, D and Z are each separately hydrogen or alkyl of one through four carbon atoms with the limitation that the total number of carbon atoms added together in A, X, D and Z is less than nine.

* * * * *